United States Patent [19]

Miyamoto

[11] Patent Number: 4,642,714
[45] Date of Patent: Feb. 10, 1987

[54] TAPE CASSETTE LOADING AND EJECTING DEVICE IN A MAGNETIC RECORDING AND/OR REPRODUCING APPARATUS

[75] Inventor: Ritsu Miyamoto, Yokohama, Japan

[73] Assignee: Victor Company of Japan, Ltd., Yokohama, Japan

[21] Appl. No.: 577,857

[22] Filed: Feb. 7, 1984

[30] Foreign Application Priority Data

Feb. 8, 1983 [JP] Japan .............................. 58-16924[U]
Feb. 22, 1983 [JP] Japan .................................. 58-27900

[51] Int. Cl.$^4$ ...................... G11B 5/008; G11B 15/00; G11B 17/00
[52] U.S. Cl. ...................................... 360/96.5; 360/93
[58] Field of Search ...................... 360/96.5, 96.6, 95, 360/93; 242/197, 198, 199

[56] References Cited

U.S. PATENT DOCUMENTS

| | | | |
|---|---|---|---|
| 4,009,213 | 7/1978 | Schatteman | 360/137 |
| 4,319,292 | 3/1982 | Katoh | 360/96.5 |
| 4,424,540 | 1/1984 | Naoi | 360/96.5 |
| 4,458,276 | 7/1984 | Okada et al. | 360/96.5 |
| 4,479,155 | 10/1984 | Takai et al. | 360/96.5 |
| 4,509,085 | 4/1985 | Saito | 360/96.5 |

FOREIGN PATENT DOCUMENTS

| | | |
|---|---|---|
| 55-160356 | 3/1981 | Japan . |
| 58-26360 | 5/1983 | Japan . |
| 2039128 | 7/1980 | United Kingdom . |
| 2045995 | 11/1980 | United Kingdom . |

Primary Examiner—A. J. Heinz
Assistant Examiner—Melissa J. Koval
Attorney, Agent, or Firm—Michael N. Meller

[57] ABSTRACT

A tape cassette loading and ejecting device comprises a cassette holder which accommodates and holds a tape cassette, a moving mechanism for moving the cassette holder between a cassette loading position and a cassette ejecting position, a motor for operating the moving mechanism, and a restricting mechanism for resiliently restricting the cassette holder in the cassette loading position and the cassette ejecting position. The restricting mechanism undergoes a resilient deformation in a final stage of the cassette loading operation and in a final stage of the cassette ejecting operation, and pushes the cassette holder against stoppers so that the cassette holder is positively maintained in the cassette loading position and the cassette ejecting position with a satisfactory precision.

6 Claims, 12 Drawing Figures

TAPE CASSETTE LOADING AND EJECTING DEVICE IN A MAGNETIC RECORDING AND/OR REPRODUCING APPARATUS

BACKGROUND OF THE INVENTION

The present invention generally relates to tape cassette loading and ejecting devices in magnetic recording and/or reproducing apparatuses, and more particularly to a tape cassette loading and ejecting device applied to a magnetic recording and/or reproducing apparatus, which is designed so that a tape cassette is inserted from a front opening of the apparatus and loaded into a predetermined loading position inside the apparatus and unloaded from the predetermined loading position.

Generally, a cassette type magnetic recording and/or reproducing apparatus is designed to operate with a cassette which accommodates a magnetic tape (such a cassette will hereinafter be referred to as a tape cassette). In the present specification and the appended claims, a so-called tape cartridge is also included within the scope of the tape cassette. The tape cartridge or cassette is loaded into a predetermined position inside the apparatus. Then, the magnetic tape (cassette tape) is automatically drawn out of the tape cassette and is guided along a predetermined tape traveling path which passes a guide drum, by an automatic tape loading mechanism.

The above automatic tape loading mechanism and the tape cassette have been reduced to practice in video tape recorders. These video tape recorders have been marketed in a large number of countries, and the construction thereof is well known.

When loading the tape cassette into the video tape recorder, the tape cassette is lowered from above the predetermined loading position. Tape draw-out members which intercept the magnetic tape and load the magnetic tape into a predetermined tape traveling path, relatively enter inside the tape cassette as the tape cassette is lowered to the predetermined loading position. Conventionally, there was a tape cassette loading and ejecting device having a cassette holder which is movable up and down. This cassette holder projected from the top plate of the video tape recorder. According to this conventional device, the tape cassette was loaded into the predetermined loading position by inserting the tape cassette into the cassette holder which projects from the top plate of the video tape recorder, and then manually pushing the cassette holder down together with the tape cassette which is accommodated within the cassette holder.

Recently, a so-called front-loading type video tape recorder has been developed. In the video tape recorder of this type, the tape cassette is partly inserted through an inserting opening which is located in the front of the video tape recorder. The partly inserted tape cassette is automatically drawn inside the video tape recorder, and is loaded into the predetermined loading position by a front-loading type tape cassette loading and ejecting device.

Examples of the conventional front-loading type tape cassette loading and ejecting device may be found in U.S. Pat. No. 4,320,424. In the tape cassette loading and ejecting devices of this type, the cassette holder is designed to be driven by a motor to move substantially in the horizontal direction and move substantially in the vertical direction, between a cassette ejecting position and a cassette loading position. It is essential that the cassette holder be accurately positioned in the cassette loading position, so that operations such as drawing out the tape from the cassette case and carrying out recording or reproduction from the tape can be correctly performed. Thus, in the cassette loading position, the cassette holder is applied with a force which is exerted by a spring and the like, and is pushed against a fixed stopper so that the cassette holder is positively maintained in the correct cassette loading position. However, there is no means provided, with respect to the cassette ejcting position of the cassette holder, for resiliently positioning and holding the cassette holder in the cassette ejecting position. In other words, the cassette ejecting position of the cassette holder is determined by the mounting position of a switch which operates to stop the rotation of the above motor. For this reason, in order to improve the accuracy with which the cassette holder is positioned in the cassette ejecting position, it is necessary to improve the precision with which the above switch is mounted.

Generally, the error in the mounting position of the switch will be emphasized and turn out as a large error in the cassette ejecting position of the cassette holder. Accordingly, the switch must be mounted with a high precision. However, it is difficult in practice to mount the switch with such a high precision when assembling the recording and/or reproducing apparatus, and in reality, the mounting position of the switch is inconsistent. When there is inconsistency in the mounting position of the switch, the cassette ejecting position of the cassette holder will become inconsistent, and as a result, there will be inconsistency in the amount of the tape cassette which projects outward from the inserting opening of the recording and/or reproducing apparatus when the tape cassette ejecting operation is completed. Thus, when the motor is stopped earlier than usual, the amount of the tape cassette which projects outward from the inserting opening will become small. In this case, there is a problem in that it will be difficult for an operator to hold and pull the tape cassette out of the recording and/or reproducing apparatus.

SUMMARY OF THE INVENTION

Accordingly, it is a general object of the present invention to provide a novel and useful tape cassette loading and ejecting device in a magnetic recording and/or reproducing apparatus, in which the above-described problems have been eliminated.

Another and more specific object of the present invention is to provide a tape cassette loading and ejecting device which is designed so that a motor continues to rotate in order to bend a spring member which is located within a cassette holder moving means before stopping to rotate during a tape cassette loading operation and also during a tape cassette ejecting operation, so that a cassette holder is pushed against a stopper and has its position restricted by use of a force exerted by the spring member not only when the tape cassette loading operation is completed but also when the tape cassette ejecting operation is completed. According to the device of the present invention, the cassette ejecting position of the cassette holder is determined with a satisfactory precision, independently of the point when the motor stops, that is, independently of the precision with which a switch which operates to stop the motor is mounted. Hence, the amount of tape cassette which projects outward from an inserting opening in a front panel of the recording and/or reproducing apparatus when the tape cassette ejecting operation is completed, is always constant. Thus, although an operator may have difficulties in holding and pulling the tape cassette out of the recording and/or reproducing apparatus if the amount of the tape cassette which projects outward from the inserting opening is inconsistent, such difficulties will not be introduced according to the device of the present invention. In addition, the switch need not be mounted with an extremely high precision, and the assembling of the recording and/or reproducing apparatus will be facilitated.

Other objects and further features of the present invention will be apparent from the following detailed description when read in conjunction with the accompanying drawings.

DETAILED DESCRIPTION

As shown in FIGS. 1 through 4, a tape cassette loading and ejecting device 10 is assembled within a magnetic recording and/or reproducing apparatus 11. Right and left parts of the loading and ejecting device 10 are substantially constructed symmetrical to each other. Accordingly, the parts which constitute the right part of the loading and ejecting device 10, and those corresponding parts which constitute the left part of the loading and ejecting device 10 are respectively designated by the same reference numerals, with a suffix "a" for the right parts and with a suffix "b" for the left parts.

Right and left support plates 12a and 12b and a top plate 13, which is disposed across these support plates 12a and 12b, constitute a frame which has an inverted U-shape viewed from the front. This inverted U-shape frame is secured to a chassis 14. A cassette holder 15 is provided movable within the inverted U-shape frame, as will be described hereinafter.

The cassette holder 15 is a frame which is constituted from right and left side plates 16a and 16b, and a bottom plate 17 and a top plate 18 which are respectively disposed across the side plates 16a and 16b. A space is formed inside the cassette holder 15, for receiving the tape cassette 19.

Figure 4:
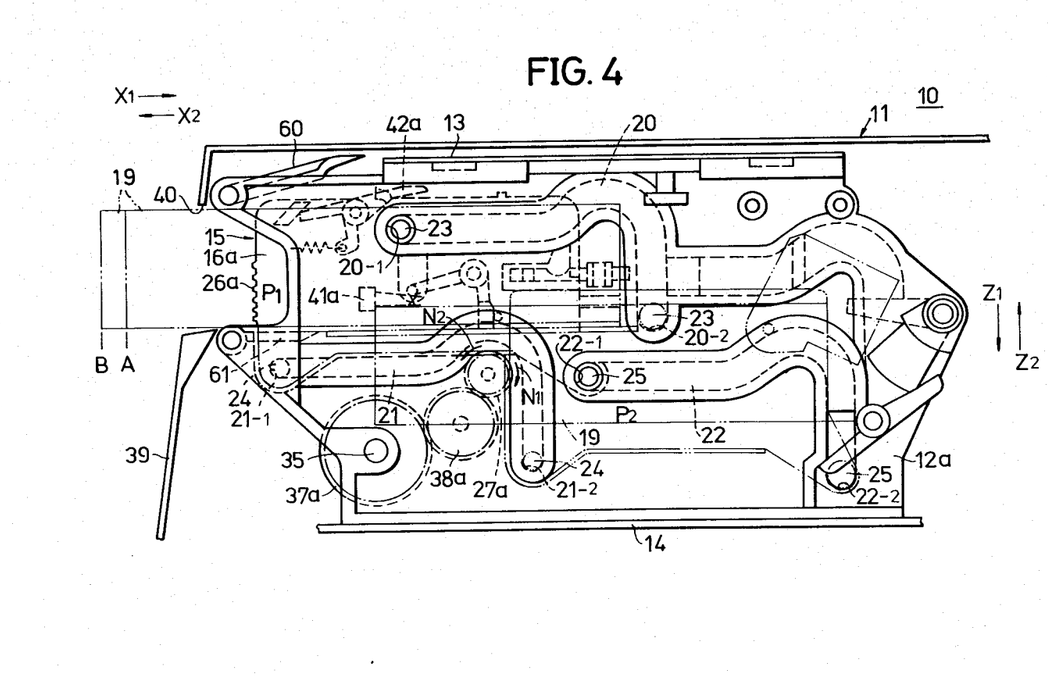
FIG. 4 shows moving states of a cassette holder, with a cassette holder driving system shown in FIG. 3 omitted.

As best shown in FIG. 4, three curved guide grooves 20, 21, and 22 are formed on the support plate 12a. Similarly, three curved guide grooves (not shown) are also formed on the left support plate 12b. Pins 23, 24, and 25 which are located on the side plate 16a of the cassette holder 15, fit into the respective guide grooves 20, 21, and 22 on the support plate 12a. Pins (not shown) located on the left side plate 16b fit into the respective guide grooves (not shown) on the left support plate 12b. Hence, the right and left sides of the cassette holder 15 are supported in a state where the pins on the side plates 16a and 16b are respectively fitted into the respective guide grooves on the support plates 12a and 12b. The cassette holder 15 is movable along the guide grooves 20, 21, and 22, between a cassette ejecting position P1 and a cassette loading position P2 shown in FIG. 4.

Racks 26a and 26b are formed on the peripheral edges of the respective side plates 16a and 16b of the cassette holder 15. These racks 26a and 26b have shapes corresponding to the shapes of the guide grooves 20 through 22. The racks 26a and 26b mesh with respective pinions 27a and 27b which are respectively located on the inner surfaces of the support plates 12a and 12b.

Next, description will be given with respect to a driving mechanism which moves the cassette holder 15.

Figure 1:
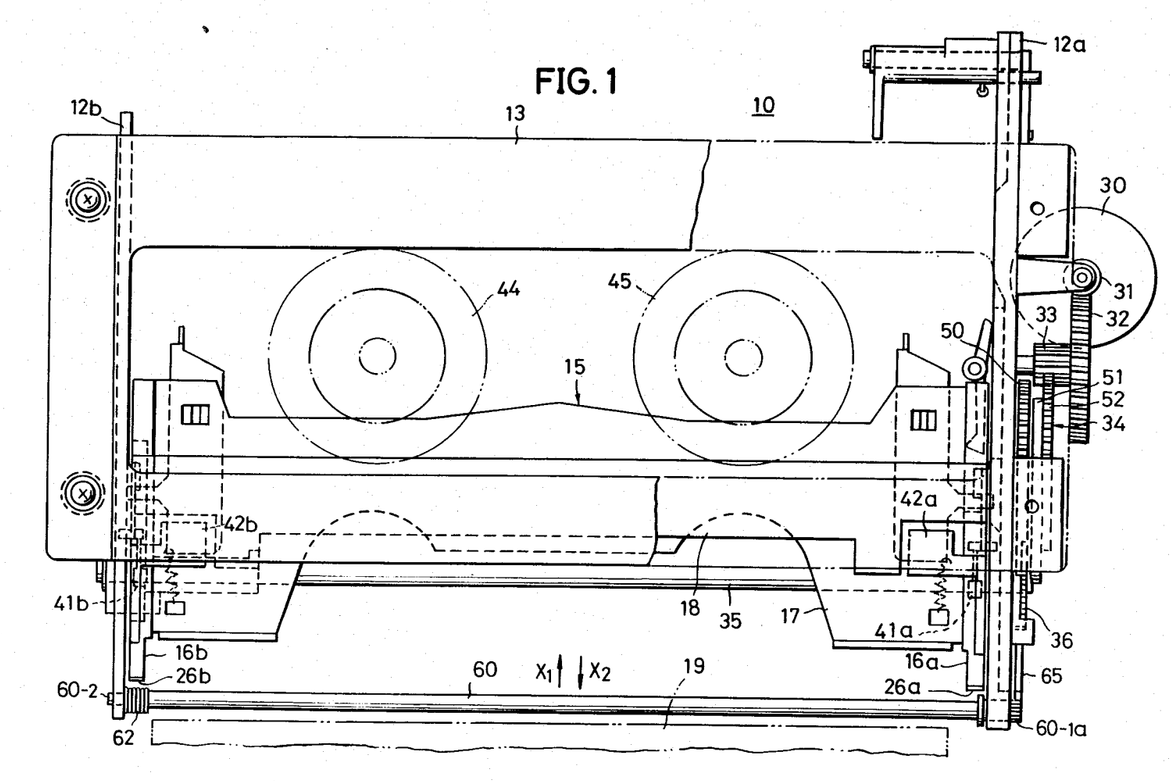
FIG. 1 is a plan view, with a part cut away, showing an embodiment of a tape cassette loading and ejecting device according to the present invention.
Figure 2:
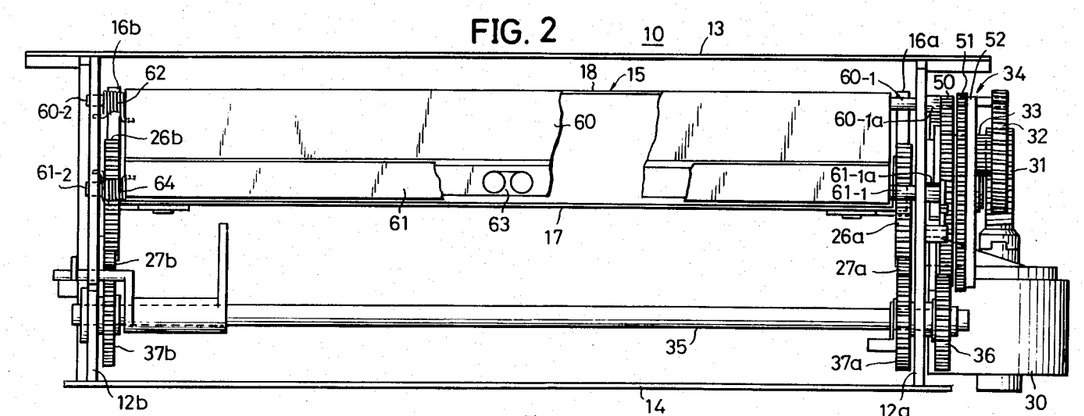
FIG. 2 is a front view showing the device shown in FIG. 1 with a part of an inserting opening cover cut away.
Figure 3:
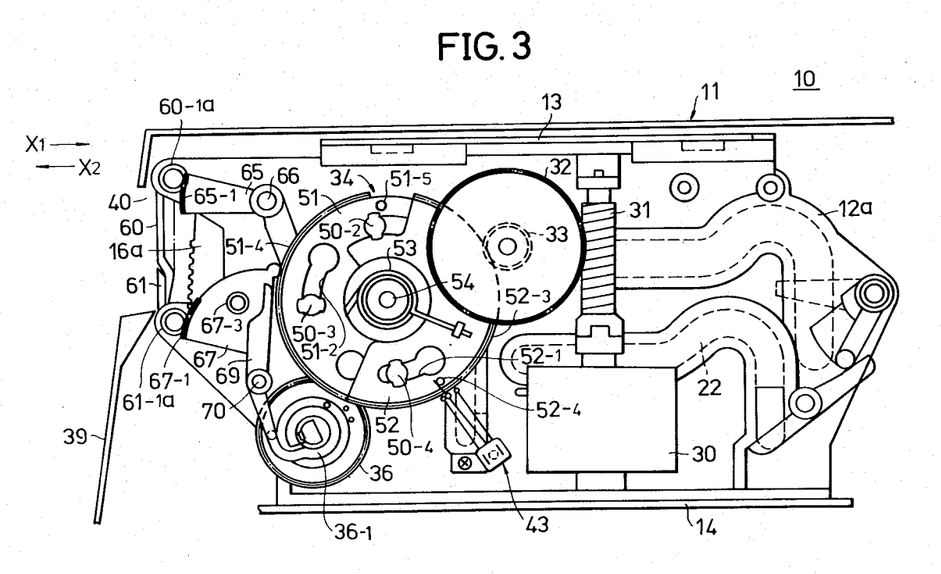
FIG. 3 is a right side view showing the device shown in FIG. 1.

As shown in FIGS. 1 through 3, a driving motor 30 is mounted on the outer side of the support plate 12a. A worm 31 is fixed to a rotary shaft of this motor 30. A worm gear 32 unitarily comprises a small-diameter gear 33 which meshes with a gear assembly 34 which constitutes an essential part of the present invention. The gear assembly 34 will be described in detail later on in the specification. A connecting shaft 35 is rotatably supported between the support plates 12a and 12b. A gear 36 is fixed to the connecting shaft 35 on the outer side of the support plate 12a. Further, a gear 37a is fixed to the connecting shaft 35 on the inner side of the support plate 12a, and a gear 37b is fixed to the connecting shaft 35 on the inner side of the support plate 12b. The gear 36 meshes with the gear assembly 34, and the gear 37a meshes with a gear 38a which is supported on the inner surface of the support plate 12a. The gear 38a meshes with the pinion 27a (FIG. 4). The other gear 37b similarly meshes with the pinion 27b through a gear (FIG. 2, not shown).

Next, a general description will be given with respect to the operations of the tape cassette loading and ejecting device 10 which is constructed as described heretofore.

Before an operation is started, the loading and ejecting device 10 is in a state shown in FIGS. 1 through 4. In this state, as best shown in FIG. 4, the cassette holder 15 assumes the cassette ejecting position P1 and opposes a tape cassette inserting opening 40 in a front panel 39 of the recording and/or reproducing apparatus 11.

When the tape cassette 19 is inserted through the inserting opening 40 in the direction of an arrow X1 up to a predetermined inserting position inside the cassette holder 15 as shown in FIG. 4 so as to start a tape cassette loading operation, detecting switches 41a and 41b are turned ON, and the motor 30 starts to rotate in the forward direction. The rotation of the motor 30 is transmitted to the connecting shaft 35, through the worm 31, the worm gear 32, the small diameter gear 33, the gear assembly 34, and the gear 36. Further, the rotation of the connecting shaft 35 is transmitted to the pinion 27a through the gears 37a and 38a, and to the pinion 27b through the gear 37b and the gear (not shown). As a result, the pinions 27a and 27b rotate in the direction of an arrow N1.

Accordingly, the cassette holder 15 is simultaneously driven by the racks 26a and 26b on both sides thereof, and moves horizontally in the direction of the arrow X1 under the guidance provided by horizontal portions of the guide grooves 20, 21, and 22. Clamp arms 42a and 42b push the top plate of the tape cassette 19, so that the tape cassette 19 is held in a state accommodated within the cassette holder 15. Thus, the tape cassette 19 moves together with the cassette holder 19. The cassette holder 15 is then guided by vertical portions of the guide grooves 20, 21, and 22, and moves downward in the direction of an arrow Z1 to the cassette loading position P2. When the cassette holder 15 reaches the cassette loading position P2, a switch 43 (which will be described later on in the specification) is activated to stop the rotation of the motor 30. As a result, the tape cassette 19 is loaded into a predetermined position where reels of the tape cassette 19 fit over respective reel discs 44 and 45 of the recording and/or reproducing apparatus 11. Thereafter, a known tape loading operation is started, and a magnetic tape accommodated within the tape cassette 19 is drawn out of the tape cassette 19 and loaded into a predetermined tape path so that recording and/or reproduction can be carried out with respect to the magnetic tape.

When a tape cassette ejecting operation is started, the motor 30 rotates in the reverse direction, and the pinions 27a and 27b rotate in the direction of an arrow N2. Thus, the cassette holder 15 moves together with the tape cassette 19 in a direction opposite to the moving direction of the cassette holder 15 during the tape cassette loading operation. In other words, the cassette holder 15 first moves in the direction of an arrow Z2, and then moves in the direction of an arrow X2 so as to return to the cassette ejecting position P1. The switch 43 is activated when the cassette holder 15 reaches the cassette ejecting position P1, and stops the rotation of the motor 30. Hence, the loading and ejecting device 10 returns to the original state shown in FIGS. 1 through 4. In this state, a part of the tape cassette 19 projects from the inserting opening 40 of the recording and/or reproducing apparatus 11. The tape cassette 19 is removed from the recording and/or reproducing apparatus 11 by an operator who holds the projecting part of the tape cassette 19 and pulls the tape cassette 19 out of the recording and/or reproducing apparatus 11.

Next, description will be given with respect to the construction of the gear assembly 34 described before, and the operation of the gear assembly 34 during the tape cassette loading and ejecting operations, by referring to FIGS. 5A, 5B, 6A, 6B, 7, and 8.

Figure 5A:
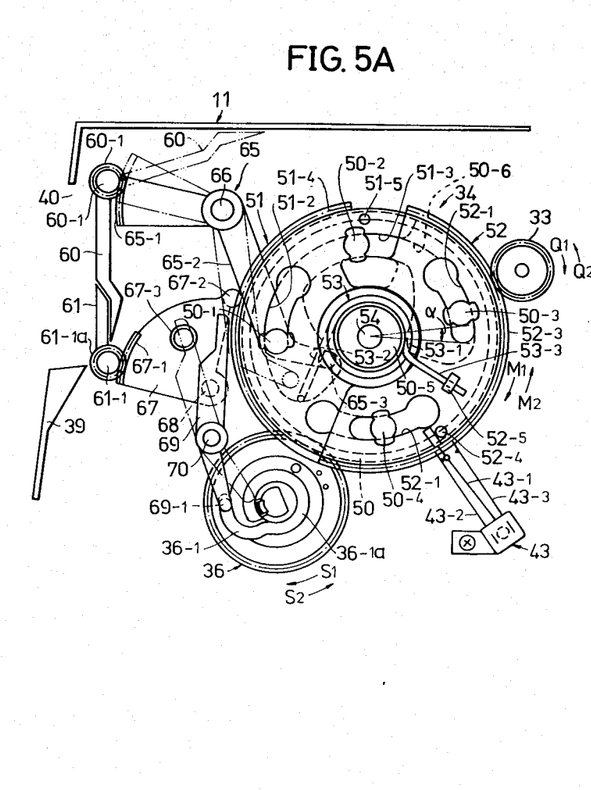
FIGS. 5A and 5B are side views in an enlarged scale respectively showing a gear assembly and a control mechanism for opening and closing the cover, when ejecting a tape cassette and when loading a tape cassette.
Figure 5B:
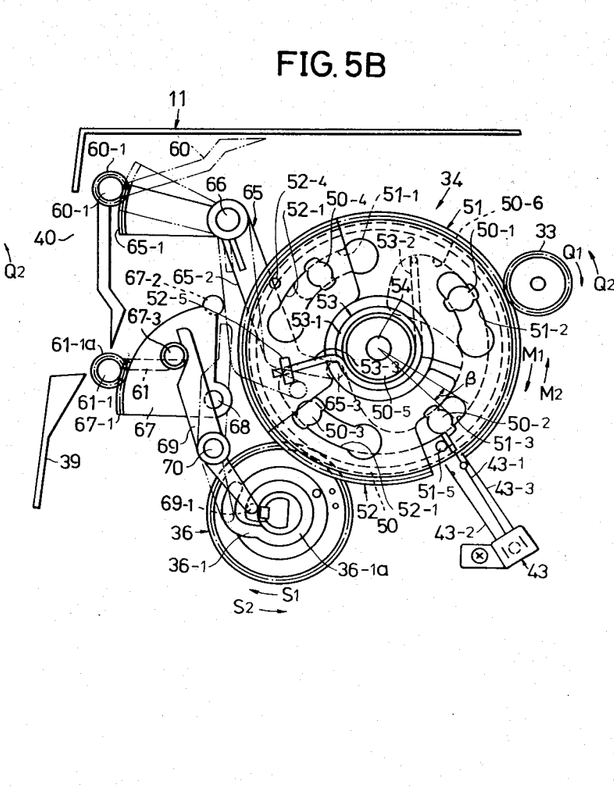

FIG. 5A shows the gear assembly 34 in a state before the tape cassette loading operation is carried out by the loading and ejecting device 10, that is, in a cassette ejecting state of the loading and ejecting device 10. On the other hand, FIG. 5B shows the gear assembly 34 in a state after the tape cassette loading operation is completed, that is, in a cassette loading state of the loading and ejecting device 10.

Figure 6A:
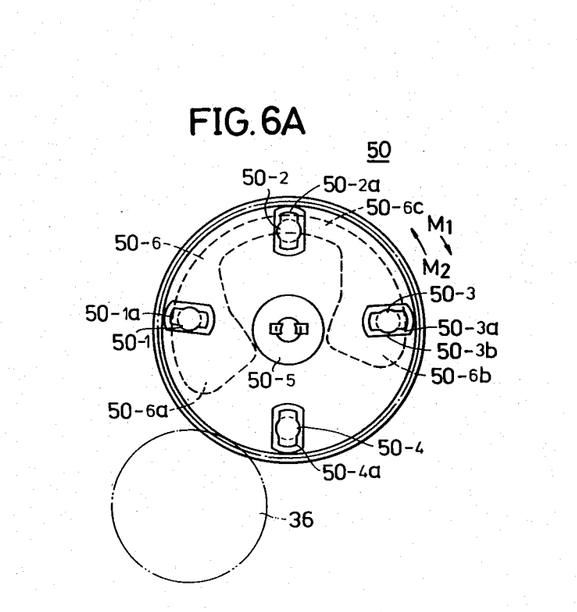
FIGS. 6A and 6B respectively are a plan view and a front view showing an output gear which constitutes the gear assembly.
Figure 6B:
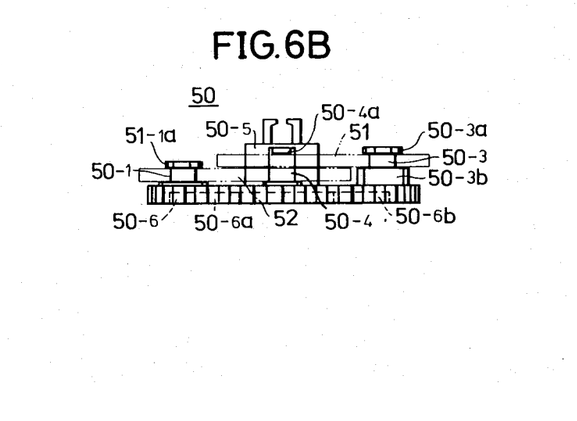
Figure 7:
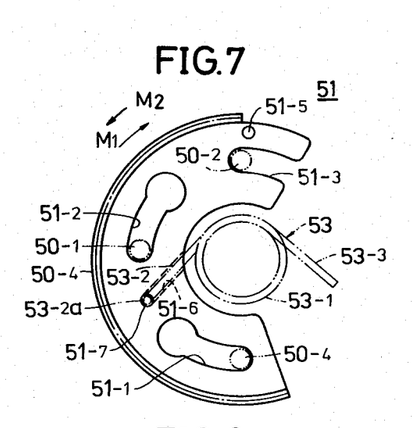
FIGS. 7 and 8 are plan views respectively showing a cassette loading gear and a cassette ejecting gear which constitute the gear assembly.
Figure 8:
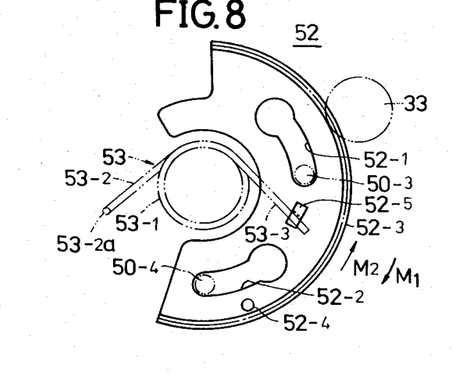

The gear assembly 34 comprises an output gear 50 shown in FIGS. 6A and 6B, a cassette loading arcuate gear 51 shown in FIG. 7 which is disposed on top of the output gear 50, and a cassette ejecting arcuate gear 52 shown in FIG. 8 which is disposed on top of the cassette loading gear 51. The gear assembly 34 further comprises a strong torsion coil spring 53 which acts on the gears 51 and 52.

As shown in FIGS. 6A and 6B, the output gear 50 comprises four guide projections 50-1, 50-2, 50-3, and 50-4 which are located on the upper peripheral surface thereof at equiangular positions. The height of the guide projections 50-1 and 50-2 corresponds to the thickness of the cassette loading gear 51. The height of the other two guide projections 50-3 and 50-4 corresponds to a combination of the thickness of the cassette loading gear 51 and the thickness of the cassette ejecting gear 52. Flanges 50-1a, 50-2a, 50-3a, and 50-4a are formed on top of the respective guide projections 50-1, 50-2, 50-3, and 50-4. The guide projection 50-3 has a step portion 50-3b at a base part thereof.

The cassette loading gear 51 comprises arcuate guide windows 51-1, 51-2, and 51-3, and a gear portion 51-4 which is formed on the outer periphery thereof, as shown in FIG. 7. As shown in FIG. 8, the cassette ejecting gear 52 comprises arcuate guide windows 52-1 and 52-2, and a gear portion 52-3 which is formed on the outer periphery thereof. Further, a pin portion 51-5 is located on the upper surface of the cassette loading gear 51, and a pin portion 52-4 is located on the upper surface of the cassette ejecting gear 52. The pin portions 51-5 and 52-4 activate the switch 43 as will be described later on in the specification.

The cassette loading gear 51 is disposed on top of the output gear 50 in a state shown in FIGS. 3 and 5A where the guide windows 51-1, 51-2, and 51-3 fit over the respective guide projections 50-4, 50-1, and 50-2 on the output gear 50. The cassette loading gear 51 is rotatable with respect to the output gear 50, within a moving range of the guide projections 50-4, 50-1, and 50-2 within the guide windows 51-1, 51-2, and 51-3. On the other hand, the cassette ejecting gear 52 is disposed on top of the cassette loading gear 51 in a state where the guide windows 52-1 and 52-2 fit over the respective guide projections 50-3 and 50-4 on the output gear 50. The cassette ejecting gear 52 is rotatable with respect to the cassette loading gear 51, within a moving range of the guide projections 50-3 and 50-4 within the guide windows 52-1 and 52-2. The gear portions 51-4 and 52-3 cooperate to form a substantially circular gear portion which has a diameter larger than the diameter of the output gear 50.

As shown in FIG. 5A, a coil portion 53-1 of the torsion coil spring 53 fits around the periphery of a boss portion 50-5 of the output gear 50. One arm portion 53-2 of the spring 53 fits into a groove 51-6 on the lower surface of the cassette loading gear 51, and a bent portion 53-2a at the tip end of this arm portion 53-2 engages a hole 51-7 in the cassette loading gear 51 (FIG. 7). On the other hand, the other arm portion 53-3 of the spring 53 engages a stopping projection 52-5 of the cassette ejecting gear 52 (FIG. 8). Due to a force exerted by the spring 53, the cassette loading gear 51 is urged to rotate clockwise in the direction of an arrow M1, and the cassette ejecting gear 52 is urged to rotate counterclockwise in the direction of an arrow M2. In a state where the gears 51 and 52 are respectively locked so as not to rotate with respect to the output gear 50 by the guide projections 50-1 through 50-4 which act as stoppers, a torque which acts on the output gear 50 in the direction of the arrow M1 from the cassette loading gear 51 and a torque which acts on the output gear 50 in the direction of the arrow M2 from the cassette ejecting gear 52 cancel each other out. Thus, the torque of the output gear 50 is zero. In the present specification, this state of the gear assembly 34 will be referred to as a stable state. In this stable state, the gears 50, 51, and 52 rotate unitarily.

The gears 51 and 52 are prevented from separating from the output gear 50 by the flanges 50-1a through 50-4a which are slightly wider than the width of the guide windows 51-1, 51-2, 51-3, 52-1, and 52-2.

As shown in FIGS. 1 through 3, the output gear 50 is rotatably supported by a pin 54 which is located on the support plate 12a. The output gear 50 meshes with the gear 36, and the gear portion 51-4 of the cassette loading gear 51 meshes with the small-diameter gear 33.

Next, description will be given with respect to the operation of the gear assembly 34 having the construction described heretofore. Before the loading and ejecting device 11 carries out the tape cassette loading operation, the gear assembly 34 assumes the state shown in FIGS. 3 and 5A. In this state, the cassette ejecting gear 52 is rotated from the stable state by an angle α (approximately 15°) in the direction of the arrow M1, against the force exerted by the spring 53. Thus, the ends of the guide windows 52-1 and 52-2 are separated from the respecitve guide projections 50-3 and 50-4. The cassette ejecting gear 52 is locked in this state by the worm 31, the worm gear 32, and the small-diameter gear 33. For this reason, the torque in the direction of the arrow M2 no longer acts on the output gear 50 from the cassette ejecting gear 52. As a result, only the torque in the direction of the arrow M1 acts on the output gear 50 from the cassette loading gear 51. Accordingly, the output gear 50 is urged to rotate in the direction of the arrow M1.

The torque of the output gear 50 in the direction of the arrow M1 is transmitted to the pinions 27a and 27b through the gear 36 and the connecting shaft 35. Hence, the pinions 27a and 27b are urged to rotate in the direction of the arrow N2. For this reason, the cassette holder 15 in the cassette ejecting position P1 is urged in the direction of the arrow X2 at both sides thereof. With respect to the right side of the cassette holder 15, the pins 23, 24, and 25 are pushed against horizontal ends 20-1, 21-1, and 22-1 of the guide grooves 20, 21, and 22 and held in place as shown in FIG. 4. The horizontal ends 20-1, 21-1, and 22-1 act as stoppers. The pins on the right side of the cassette holder 15 are held similarly. Therefore, the cassette holder 15 is stably held in the cassette ejecting position P1 with satisfactory precision, without play.

In addition, in the above state, the pin portion 52-4 of the cassette ejecting gear 52 makes contact with a movable contact 43-1 of the switch 43. The movable contact 43-1 of the switch 43 is thus in contact with a stationary contact 43-2.

Because the cassette holder 15 is stably held in the cassette ejecting position P1 with satisfactory precision, an inserting position A (FIG. 4) of the tape cassette 19 at the point when the detecting switches 41a and 41b are turned ON, will not be different among different recording and/or reproducing apparatuses, and will be constant. Further, since the cassette holder 15 is stably held in the cassette ejecting position P1 without play, the operator can manually insert the tape cassette 19 smoothly into the cassette holder 15.

As described before, the small-diameter gear 33 rotates in the direction of an arrow Q1 when the motor 30 rotates in the forward direction. The rotation of the small-diameter gear 33 is transmitted to the cassette ejecting gear 52, and the cassette ejecting gear 52 is rotated in the direction of the arrow M2. First, the cassette ejecting gear 52 rotates independently, and the gear assembly 34 is returned to the stable state. Thereafter, the entire gear assembly 34 rotates in the direction of the arrow M2, and the rotation of the output gear 50 is transmitted to the gear 36. The small-diameter gear 33 drives the gear assembly 34 by the gear portion 52-3 and then by the gear portion 51-4, and rotates the gear assembly 34 by approximately 190° so as to carry out the tape cassette loading operation.

The motor 30 continues to rotate even after the cassette holder 15 reaches the cassette loading position P2. By this continued rotation of the motor 33, the cassette loading gear 51 is driven by the small-diameter gear 33. Hence, as shown in FIG. 5B, the cassette loading gear 51 rotates independently in the direction of the arrow M2, against the force exerted by the spring 53. When the cassette loading gear 51 rotates independently over an angle β, the pin portion 51-5 pushes the movable contact 43-1 of the switch 43. Thus, the movable contact 43-1 switches over to make contact with another stationary contact 43-3, to stop the rotation of the motor 30. In addition, the ends of the guide windows 51-1, 51-2, and 51-3 separate from the respective guide projections 50-4, 50-1, and 50-2 as the cassette loading gear 51 rotates. As a result, the force exerted by the spring 53 is transmitted to the output gear 50 by way of the cassette ejecting gear 52, and the output gear 50 is urged to rotate in the direction of the arrow M2. The torque of the outut gear 50 in the direction of the arrow M2 is transmitted as a torque in the direction of the arrow N1 to the pinions 27a and 27b. Accordingly, the cassette holder 15 is urged to move in the direction of the arrow Z1. In this state, the pins 23, 24, and 25 push against respective vertical ends 20-2, 21-2, and 22-2 of the guide grooves 20, 21, and 22, as shown in FIG. 4. The vertical ends 20-2, 21-2, and 22-2 act as stoppers, and the cassette holder 15 is held in the cassette loading position P2 with satisfactory precision. Therefore, the tape cassette 19 is stably loaded into the predetermined position inside the recording and/or reproducing apparatus 11.

The tape cassette ejecting operation is also carried out until the gear assembly 34 assumes the state shown in FIG. 5A. As a result, the pins 23, 24, and 25 push against the respective horizontal ends 20-1, 21-1, and 22-1 of the guide grooves 20, 21, and 22 as shown in FIG. 4, and the cassette holder 15 is positioned in the cassette ejecting position P1 with satisfactory precision. Hence, a position B of the ejected tape cassette 19, which projects from the inserting opening 40 of the recording and/or reproducing apparatus 11, will not be inconsistent among different recording and/or reproducing apparatuses. If the amount of the tape cassette 19 which projects from the inserting opening 40 is too small, it will be difficult for the operator to hold and pull the ejected tape cassette 19 out of the recording and/or reproducing apparatus 11 as described before, however, such an inconvenience will not occur according to the present invention. Furthermore, because the cassette holder 15 is stably held in the cassette ejecting position P1 without play, the tape cassette 19 can be pulled smoothly out of the recording and/or reproducing apparatus 11.

As may be understood from the description given heretofore, the switch 43 stops the rotation of the motor 30, which continues to rotate even after the cassette holder 15 reaches the positions P1 and P2. For this reason, even when an error exists in the mounting position of the switch 43, the positions where the cassette holder 15 is stopped and held are independent of this error, and the cassette holder 15 is positively stopped and held at the positions P1 and P2 with satisfactory precision. Accordingly, it becomes unnecessary to mount the switch 43 with high precision, and the assembling of the loading ejecting device 10 and consequently the recording and/or reproducing apparatus 11 is facilitated.

Next, description will be given with respect to a cover mechanism which is located at the inserting opening 40 of the recording and/or reproducing apparatus 11.

As shown in FIGS. 1 through 3, a main cover 60 and a sub cover 61 are respectively provided at the front of the recording and/or reproducing apparatus 11, within the inserting opening 40.

Pin portions 60-1 and 60-2 of the main cover 60 are supported by the respective support plates 12a and 12b, and the main cover 60 is disposed in the upper part of the inserting opening 40. A torsion coil spring 62 is fitted over the pin portion 60-2, and one end of this spring 62 engages with the support plate 12b and the other end of this spring 62 engages with the main cover 60. The spring 62 urges the cover 60 to rotate clockwise (closing direction) in FIG. 3. The dimension of the main cover 60 substantially corresponds to the dimension of the inserting opening 40, and thus, the main cover 60 can independently cover the inserting opening 40. A mark 63, which indicates that there is a tape cassette loaded within the recording and/or reproducing apparatus 11, is put on a lower central part of the main cover 60.

Pin portions 61-1 and 61-2 of the sub cover 61 are supported by the respective support plates 12a and 12b, and the sub cover 61 is disposed in the lower part of the inserting opening 40. A torsion coil spring 64 is fitted over the pin portion 61-2, and one end of this spring 64 engages with the support plate 12b and the other end of the spring 64 engages with the sub cover 61. The spring 64 urges the sub cover 61 to rotate counterclockwise (closing direction) in FIG. 3. The sub cover 61 has a shape so that the mark 63 on the main cover 60 is covered and is not visible when the sub cover 61 is closed.

As shown in FIGS. 3 and 5A, a first lever 65 for opening and closing the main cover 60 is supported by a pin 66 which is located on the outer surface of the support plate 12a. A fan-shaped second lever 67 for opening and closing the sub cover 61 is supported by a pin 68 which is also located on the outer surface of the support plate 12a. A third lever 69, which controls the rotation of the second lever 67, is supported by a pin 70 which is located on the outer surface of the support plate 12a.

The first lever 65 has a fan-shaped gear portion 65-1. This gear portion 65-1 meshes with a gear 60-1a which is integrally provided on the pin portion 60-1. The first lever 65 also has an arm portion 65-2 which has a pin 65-3 at the tip end thereof. The pin 65-3 fits into a substantially U-shaped cam groove 50-6 (FIGS. 6A and 6B) which is formed on the bottom surface of the output gear 50. As shown in FIG. 6A, the cam groove 50-6 comprises wide portions 50-6a and 50-6b on both sides thereof, and a narrow portion 50-6c between the wide portions 50-6a and 50-6b. Before the tape cassette loading operation is carried out, the pin 65-3 is located at the wide portion 50-6a of the cam groove 50-6.

The second lever 67 has a fan-shaped gear portion 67-1. This gear portion 67-1 meshes with a gear 61-1a which is integrally provided on the pin portion 61-1.

The third lever 69 has a pin 69-1 at one end thereof. This pin 69-1 fits into a substantially spiral cam groove 36-1 which is formed on the gear 36. Before the tape cassette loading operation is carried out, the pin 69-1 is guided by the outer periphery of the cam groove 36-1 as shown in FIGS. 3 and 5A, and the third lever 69 is rotated clockwise.

Figures 9A, 9B:
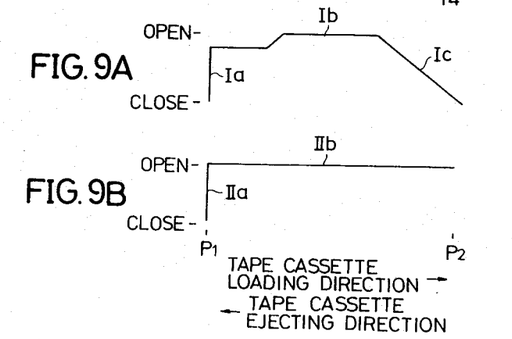
FIGS. 9A and 9B are graphs respectively showing opening and closing operations of a main cover and a sub cover in response to a tape cassette loading operation.

Next, description will be given with respect to the opening and closing operations of the main and sub covers 60 and 61 in relation to the tape cassette loading and ejecting operations, by referring to FIGS. 9A and 9B. FIGS. 9A and 9B respective show the states of the main and sub covers 60 and 61 at various positions of the cassette holder 15.

Before the loading and ejecting device 10 carries out the tape cassette loading operation, that is, when the cassette holder 15 assumes the cassette ejecting position P1, the main and sub covers 60 and 61 respectively assume their vertical positions and cover the inserting opening 40 as shown in FIGS. 2, 3, and 5A. The sub cover 61 is positioned in front of the main cover 60, and the mark 63 on the main cover 60 is covered by the sub cover 61. In this state, the first lever 65 is rotated counterclockwise. On the other hand, the second lever 67 is rotated clockwise, and a pin 67-2 of the second lever 67 makes contact with the arm portion 65-2.

When the tape cassette 19 is inserted into the inserting opening 40, the main and sub covers 60 and 61 are respectively pushed by the inserted tape cassette 19. Thus, the main cover 60 rotates counterclockwise in FIG. 5A against the force exerted by the spring 62 and opens (refer to a line portion Ia in FIG. 9A), while the sub cover 61 rotates clockwise in FIG. 5A against the force exerted by the spring 64 and also opens (refer to a line portion IIa in FIG. 9B). The first lever 65 rotates clockwise, while the second lever 67 rotates counterclockwise.

The tape cassette loading operation is started when the tape cassette 19 is inserted into the cassette holder 15 and starts the motor 30 to rotate. Then, the output gear 50 rotates in the direction of the arrow M2, and the gear 36 rotates in the direction of an arrow S1. The pin 65-3 enters into the narrow portion 50-6c of the cam groove 50-6 from the wide portion 50-6a, and the first lever 65 is further rotated clockwise as indicated by a two-dot chain line in FIG. 5A. Consequently, the main cover 60 rotates further counterclockwise, and assumes a fullopen state (refer to a line portion Ib in FIG. 9A) indicated by a two-dot chain line in FIG. 5A. In addition, the pin 69-1 is guided by the cam groove 36-1 and moves toward the center of the gear 36, and the third lever 69 rotates counterclockwise as indicated by a two-dot chain line in FIG. 5A. Thus, the third lever 69 engages with and stops a pin 67-3 of the second lever 67 as shown in FIG. 5B, so as to restrict the clockwise rotation of the second lever 67. Accordingly, the sub cover 61 is prevented from closing. Thereafter, the pin 67-3 is guided by a circular groove portion 36-1a of the cam groove 36 until the tape cassette loading operation is completed. Hence, the third lever 69 is maintained at the above rotational position, and the sub cover 61 is maintained in a full-open state (refer to a line portion IIb in FIG. 9B) indicated by a two-dot chain line in FIG. 5B.

As the tape cassette loading operation progresses, the pin 65-3 escapes from the narrow portion 50-6c of the cam groove 50-6 and enters into the wide portion 60-6b. In this state, the first lever 65 is no longer restricted in its counterclockwise rotation, and the main cover 60 gradually rotates clockwise (refer to a line portion Ic in FIG. 9A) due to the action of the spring 62. The main cover 60 finally assumes its vertical position and covers the inserting opening 40 as shown in FIG. 5B. In this state, the mark 63 on the main cover 60 is exposed and is visible by the operator. Therefore, it is indicated by the visible mark 63 that the tape cassette 19 is loaded within the recording and/or reproducing apparatus 11.

During the tape cassette ejecting operation, the output gear 50 rotates in the direction of the arrow M1 from the state shown in FIG. 5B. The gear 36 rotates in the direction of an arrow S2. As a result, the levers 65, 67, and 69 respectively move in a sequence in reverse to the moving sequence at the time of the tape cassette loading operation, and respectively rotate in directions opposite to the rotating directions at the time of the tape cassette loading operation. Accordingly, the main cover 60 first rotates counterclockwise in FIG. 5B and opens (refer to a line portion Ic in FIG. 9A) to uncover the inserting opening 40. As the tape cassette ejecting operation progresses and the cassette holder 15 reaches the cassette ejecting position P1, the main and sub covers 60 and 61 are respectively released from their restricted states, and the main and sub covers 60 and 61 become rotatable in the respective closing directions. In this state, the main and sub covers 60 and 61 respectively make contact with the top and bottom surfaces of the tape cassette 19. For this reason, when the tape cassette 19 is pulled out from the cassette holder 15, the main and sub covers 60 and 61 are no longer restricted in their rotation in the respective closing directions, and the main and sub covers 60 and 61 respectively rotate (refer to the line portion Ic in FIG. 9A and the line portion IIa in FIG. 9B) in directions opposite to the rotating directions at the time when the tape cassette 19 was inserted into the cassette holder 15. Finally, the main and sub covers 60 and 61 respectively cover the inserting opening 40 as shown in FIGS. 2, 3, and 5A, in a state where the sub cover 61 covers the mark 63 on the main cover 60.

Further, the present invention is not limited to these embodiments, but various variations and modifications may be made without departing from the scope of the present invention.

What is claimed is:

1. A tape cassette loading and ejecting device comprising:
    a cassette holder for accommodating and holding a tape cassette which is inserted therein;
    support means for supporting said cassette holder, said cassette holder being movable relative to said support means between a cassette loading position and a cassette ejecting position;
    first stopper means provided on said support means for stopping said cassette holder in said cassette loading position when said cassette holder reaches said cassette loading position;
    second stopper means provided on said support means for stopping said cassette holder in said cassette ejecting position when said cassette holder reaches said cassette ejecting position;
    moving means provided on at least one of said cassette holder and said support means for moving said cassette holder between said cassette loading position and said cassette ejecting position;
    a motor for operating said moving means, said motor rotating in a forward direction during a tape cassette loading operation and rotating a reverse direction during a tape cassette ejecting operation;
    rotation transmitting means for transmitting the rotation of said motor to said moving means, said rotation transmitting means comprising an output gear for transmitting the rotation of said motor to said moving means, a first gear which is rotated by the rotation of said motor during the tape cassette loading operation, a second gear which is rotated by the rotation of said motor during the tape cassette ejecting operation, and spring means which is resiliently deformable and is disposed between said first and second gears so that rotary axes of said output gear, said first gear and said second gear are coaxially provided, said output gear rotating unitarily with said first gear during the tape cassette loading operation until said cassette holder is stopped by said first stopper means at said cassette loading position, said first gear continuously rotating but separately from said output gear after said cassette holder reaches said cassette loading position during the tape cassette loading operation so that said spring means is deformed to press said cassette holder to said first stopper means, said output gear rotating during the tape cassette ejecting operation unitarily with said second gear until said cassette holder is stopped by said second stopper means at said cassette ejecting position, said second gear continuously rotating but separately from said output gear after said cassette holder reaches said cassette ejecting position so that said spring means is deformed to press said cassette holder to said second stopper means; and
    a switch for stopping the rotation of said motor in an activated state thereof, said switch being activated by the separate rotation of said first gear from said output gear during the tape cassette loading operation and the separate rotation of said second gear from said output gear during the tape cassette ejecting operation.

2. A tape cassette loading and ejecting device as claimed in claim 1 in which said output gear has guide projections located on an upper surface thereof, said first and second gears respectively have arcuate guide windows which fit over the respective guide projections of the output gear, said spring means is constituted by a torsion coil spring, said first and second gears are disposed coaxially on top of the output gear in a state where said guide windows of the first and second gears are fitted over said guide projections of the output gear, and said first and second gears are urged by said torsion coil spring in opposite directions when said torsion coil spring is deformed due to either of the separate rotations of said first and second gears from said output gear.

3. A tape cassette loading and ejecting device as claimed in claim 1 which said support means comprises a pair of support plate disposed on both sides of the cassette holder so as to oppose each other, and guide grooves formed on said support plate, said guide grooves support and guide the cassette holder at both sides thereof between said cassette loading position and said cassette ejecting position, and said first and second stopper means are respectively constituted by ends of said guide grooves.

4. A tape cassette loading and ejecting device as claimed in claim 1 in which said first and second gears each have an engaging portion which activates said switch to stop the rotation of said motor.

5. A tape cassette loading and ejecting device as claimed in claim 1 which further comprises an inserting opening located at the front of said tape cassette loading ejecting device, said tape cassette being inserted through said inserting opening into the cassette holder which is in the cassette ejecting position, a main cover located at said inserting opening and covering the inserting opening in a closed position thereof, said main cover having an indication on the front at a lower central portion thereof for indicating that the tape cassette is loaded within the loading and ejecting device, a sub cover located at said inserting opening, said sub cover being disposed in fron of said main cover and covering said indication on said main cover in a closed position thereof, a main cover opening means driven by said rotation transmitting means for opening said main cover as the cassette holder moves between the cassette loading position and the cassette ejecting position, and a sub cover opening means driven by said rotation transmitting means for opening said sub cover while the cassette holder assumes a position other than said cassette loading position, said main cover covering the inserting opening ina state where said indication thereon is exposed when the cassette holder assumes said cassette loading position.

6. A tape cassette loading and ejecting device as claimed in claim 5 in which said main cover opening means comprises a rotary lever which rotates to open said main cover, and a cam groove which is formed on the output gear which rotates said rotary lever.

* * * * *